(12) United States Patent
Otero Solivan

(10) Patent No.: US 11,045,932 B2
(45) Date of Patent: Jun. 29, 2021

(54) MUFFLER HANGER ASSEMBLY TOOL

(71) Applicant: Honda Motor Co., Ltd., Tokyo (JP)

(72) Inventor: Orlando Otero Solivan, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 465 days.

(21) Appl. No.: 16/048,532

(22) Filed: Jul. 30, 2018

(65) Prior Publication Data

US 2020/0030952 A1 Jan. 30, 2020

(51) Int. Cl.
 B25B 27/00 (2006.01)
 B25B 27/14 (2006.01)
 B62D 65/16 (2006.01)
(52) U.S. Cl.
 CPC .......... *B25B 27/0035* (2013.01); *B25B 27/14* (2013.01); *B62D 65/16* (2013.01)
(58) Field of Classification Search
 CPC ..... B25B 27/0035; B25B 27/14; B62D 65/16; B62D 65/024

USPC ........... 29/271; 81/176.1, 176.15, 176.2, 186
See application file for complete search history.

(56) References Cited

U.S. PATENT DOCUMENTS

| 5,347,891 | A | * | 9/1994 | Kamp | B25B 13/10 |
| | | | | | 81/120 |
| 2013/0276279 | A1 | * | 10/2013 | Cheng | B25B 27/14 |
| | | | | | 29/256 |
| 2016/0052110 | A1 | * | 2/2016 | Erdman | B25B 27/00 |
| | | | | | 29/464 |

* cited by examiner

*Primary Examiner* — Joseph J Hail
*Assistant Examiner* — J Stephen Taylor
(74) *Attorney, Agent, or Firm* — American Honda Motor Co., Inc.; Clifford B Vaterlaus

(57) ABSTRACT

A tool for mounting a muffler on a vehicle includes a tool body having a tool support member with mounting holes and walls with an external peripheral surface configured to connectively receive a muffler hanger stay. The walls define an interior recessed region configured to connectively receive a muffler hanger. A tool handle member extends from the tool support member to facilitate manual alignment and mounting of the muffler hanger and the muffler hanger stay on the muffler and the vehicle.

20 Claims, 15 Drawing Sheets

MUFFLER HANGER ASSEMBLY TOOL

TECHNICAL FIELD

Embodiments of the present disclosure relate to a tool configured to mount a muffler hanger on a vehicle in an efficient manner.

BACKGROUND

A muffler hanger is configured to suspend a muffler to a vehicle body. The muffler hanger may be embodied as a bracket or bushing composed of an elastic material such as rubber, which permits the dampening of vibrations of the suspended muffler during operation of the vehicle.

Installation of the muffler hanger is generally performed manually by hand through the application of force by pushing the muffler hanger in place. This is undesirable due to the complicated manner and nature of obtaining the precise alignment of the muffler hanger on the vehicle body and the muffler.

SUMMARY

Some embodiments of the present disclosure relate to a tool configured to mount a muffler hanger on a vehicle in an efficient manner.

In accordance with some embodiments of the present disclosure, a tool for mounting a muffler on a vehicle may include a tool support member having mounting holes and walls with an external peripheral surface configured to connectively receive a muffler hanger stay to align the mounting holes with corresponding holes of the muffler hanger stay. The walls may define an interior recessed region configured to connectively receive a muffler hanger to align the mounting holes with corresponding holes of the muffler hanger. The tool may also include a tool handle member extending from the tool support member to define an opening configured to be gripped by a user and thereby permit manual alignment and mounting of the muffler hanger and the muffler hanger stay on the muffler and the vehicle.

In accordance with further embodiments of the present disclosure, a tool to mount a muffler on a vehicle may include a tool support member configured for connection to a muffler hanger stay at a first connection region provided at a peripheral surface of the tool support member. The tools support member may also be configured for connection to a muffler hanger at a second connection region provided at an interior recessed region of the tool support member. The tool member may have mounting holes configured for alignment with corresponding holes of the muffler hanger stay and the muffler hanger. The tool may also include a tool handle member to permit gripping of the tool handle member and thereby permit manual alignment and mounting of the muffler hanger and the muffler hanger stay on the muffler and the vehicle.

In accordance with other embodiments of the present disclosure, a tool to mount a muffler on a vehicle may include a tool body having a tool support member configured for connection to a muffler hanger stay at a first connection region provided at a peripheral surface of the tool support member, and also for connection to a muffler hanger at a second connection region provided at an interior recessed region of the tool support member. The tool member may have mounting holes configured for alignment with corresponding holes of the muffler hanger stay and the muffler hanger. The tool body may therefore be configured to permit manual alignment and mounting of the muffler hanger and the muffler hanger stay on the muffler and the vehicle.

DRAWINGS

Embodiments of the present disclosure will be illustrated by way of example in the drawings and explained in the description below.

DESCRIPTION

Figure 1:
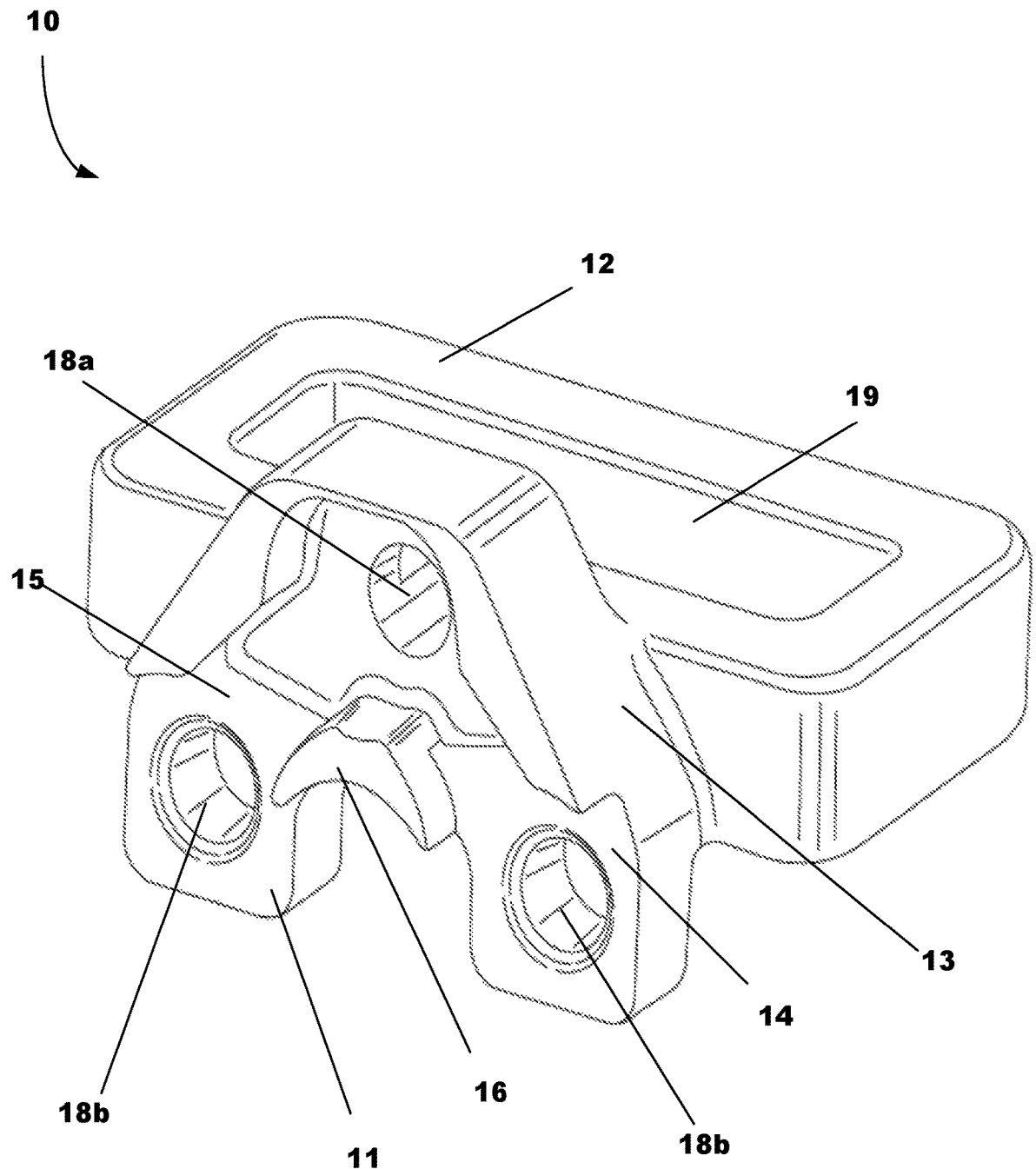
FIG. 1 illustrates a front perspective view of a muffler hanger assembly tool, in accordance with one embodiment of the present disclosure.

While the concepts of the present disclosure are susceptible to various modifications and alternative forms, specific embodiments have been shown by way of example in the drawings and will be described herein in detail. It should be understood, however, that there is no intent to limit the scope of the present disclosure to the particular forms disclosed, but on the contrary, the intention is to cover all modifications, equivalents, and alternatives consistent with the present disclosure and the appended claims.

References in the specification to "one embodiment," "an embodiment," "embodiments," an illustrative embodiment," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

Figure 2:
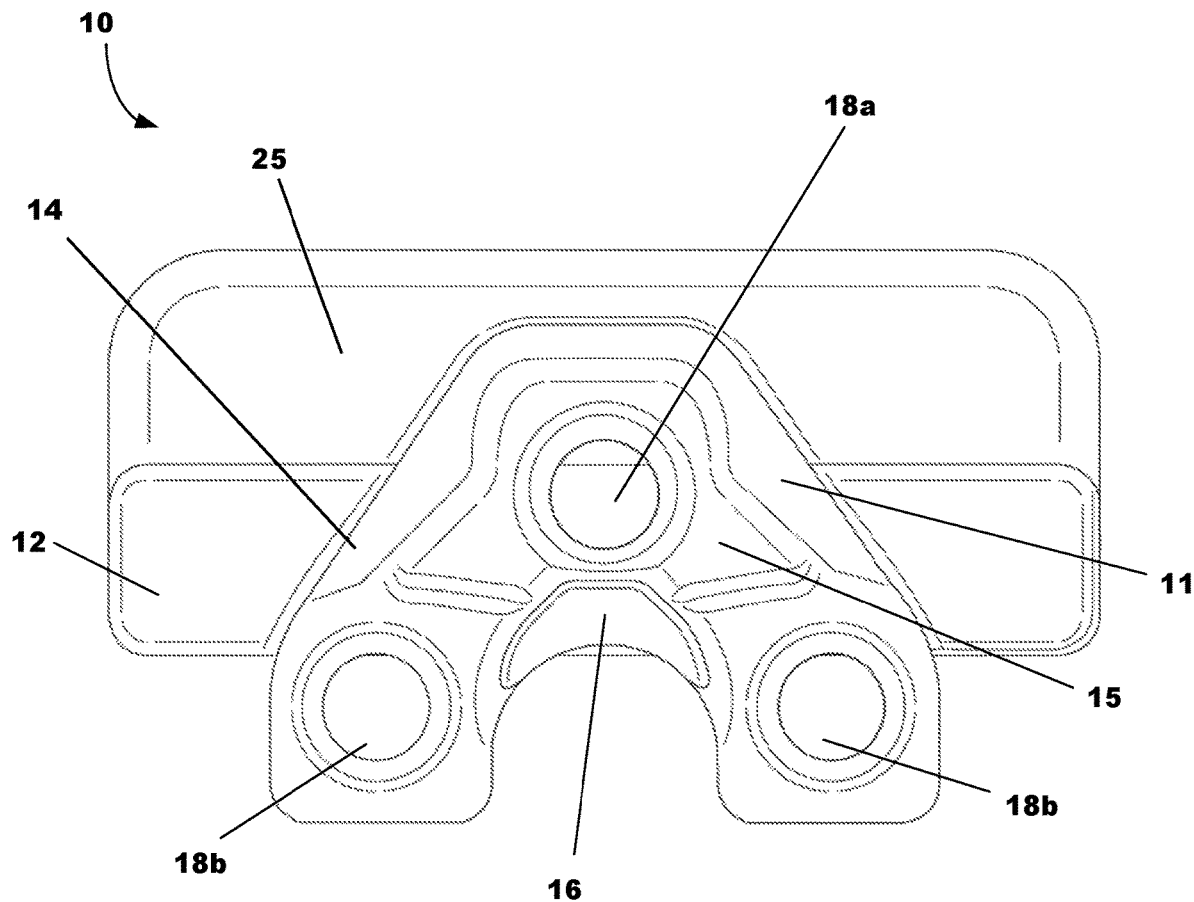
FIG. 2 illustrates a front view of a muffler hanger assembly tool.
Figure 3:
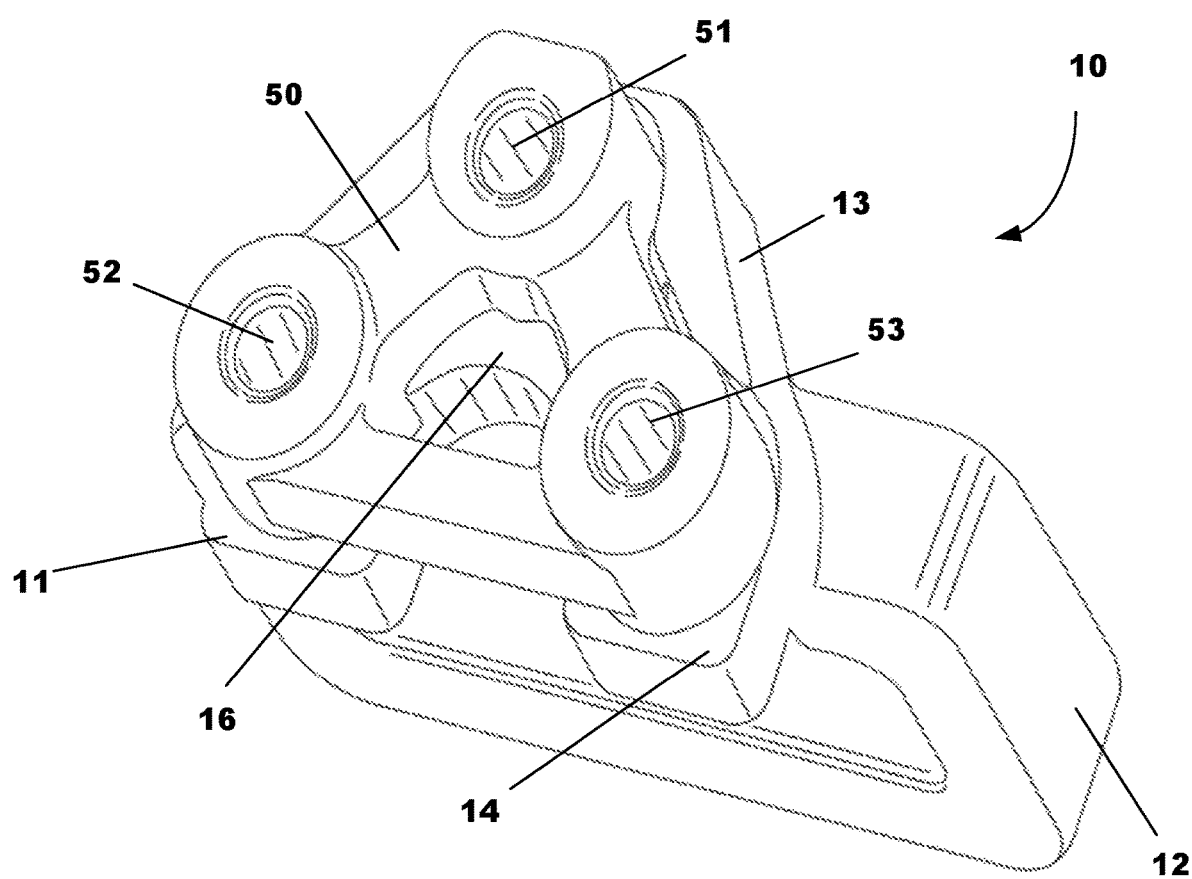
FIG. 3 illustrates a perspective view of a muffler hanger connected to the muffler hanger assembly tool of FIG. 1.

As illustrated in FIGS. 1 to 7, a tool 10 is provided to facilitate manual installation of a muffler 20, as shown in FIGS. 8A-8H, for suspension on a vehicle frame 30. As an example, such manual installation may be performed via the tool 10 through the mounting of a muffler hanger assembly that includes a muffler hanger stay 40, shown in FIG. 4, and a muffler hanger 50, as shown in FIG. 3. Particularly, use of the tool 10 permits the manual and stable mounting of the muffler hanger stay 40 and the muffler hanger 50 on the muffler 20 and the vehicle frame 30. Use of the tool advantageously permits such manual installation by a user in an efficient and ergonomic manner.

The tool 10 includes a tool body having a first tool body region to serve as a tool support member 11, and a second tool body region to serve as a tool handle member 12. The tool handle member 12 may be arranged to extend from a rear face 17 of the tool support member 11. The tool support member 11 and the tool handle member 12 may be composed of a durable material. Such a material may comprise, for example, a plastic material such as a polymer. Embodiments of the present disclosure, however, are not limited thereto, and thus, may reasonably encompass other materials (e.g., metal, composites, etc.) that permit practice of the concepts described in the present disclosure. The tool 10 may be formed, for example, via 3D printing, machining, or injection molding. Although the illustrated embodiment provides for a tool 10 having a single, unitary structure that includes the tool support member 11 and the tool handle member 12, embodiments of the present disclosure are not limited thereto, and thus, may reasonably encompass a non-unitary structure in which the tool support member 11 and the tool handle member 12 are separate components that may be fixedly or non-fixedly connected. Moreover, although the body of the tool support member 11 is illustrated having a somewhat A-shaped portion, embodiments of the present disclosure are not limited thereto, and thus, may reasonably encompass other geometric shapes that permit practice of the concepts of the present disclosure.

The tool 10 may include a guard 25 between the tool support member 11 and the tool handle member 12, as shown in FIGS. 2 and 5-7. However, it will be understood that the guard 25 is optional, and the tool 10 as shown in FIG. 1 without the guard 25 may otherwise be similar such that the reference numerals used are the same throughout the figures. The guard 25 may provide an additional barrier to protect the user's hand while using the tool 10.

Figure 4:
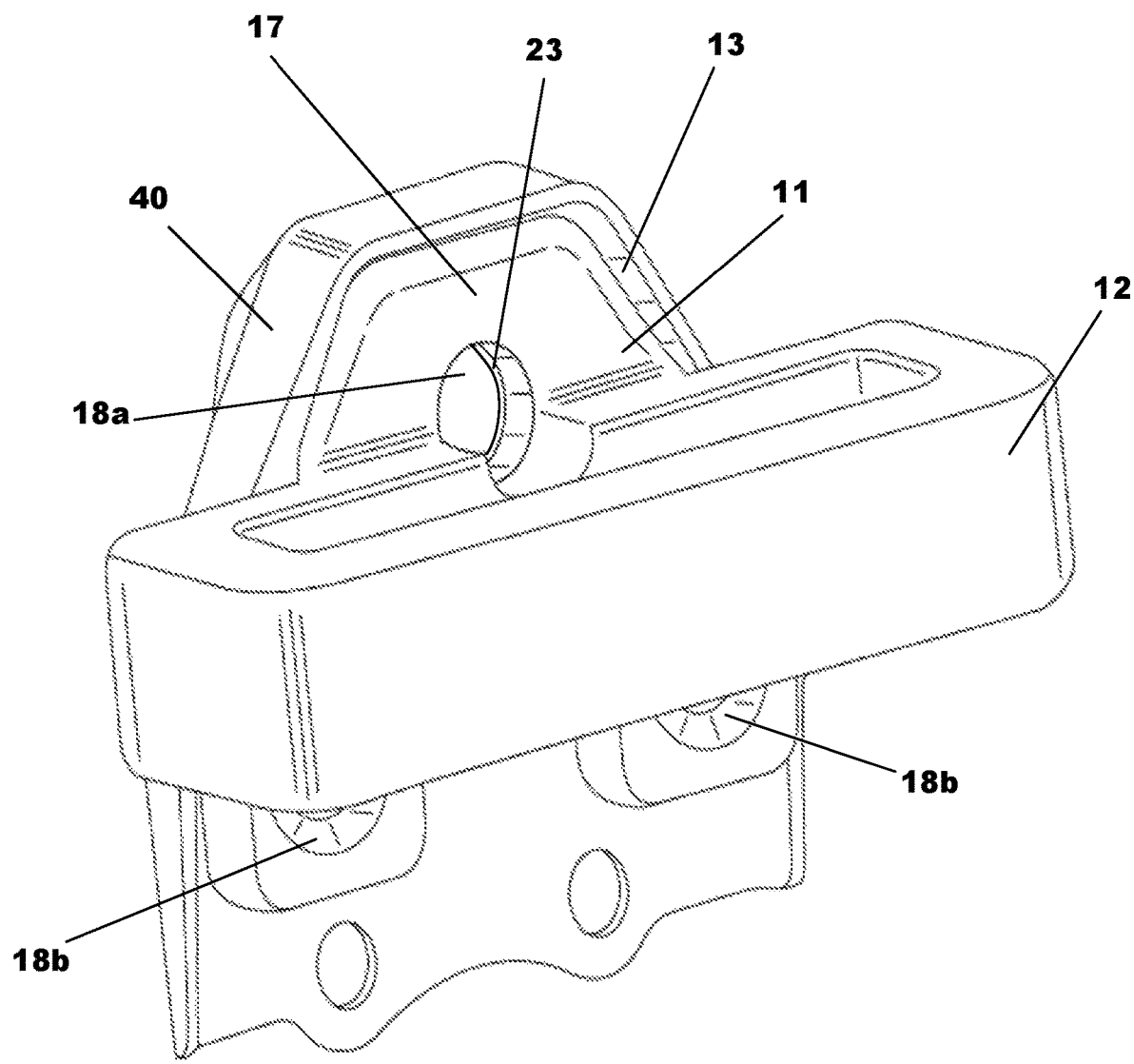
FIG. 4 illustrates a rear perspective view of a muffler hanger stay connected to the muffler hanger assembly tool of FIG. 1.

The tool support member 11 is configured for connection to the muffler hanger stay 40, shown in FIG. 4, at a first connection region located at a peripheral outer surface of the tool support member 11. The tool support member 11 includes walls 13 having an external surface defining, at least partially, the first connection region. The connection between the tool support member 11 and the muffler hanger stay 40 may comprise, for example, an interference fit between the tool support member 11 and to the muffler hanger stay 40.

The tool support member 11 is configured for connection to the muffler hanger 50, shown in FIG. 3, at a second connection region located at an interior region of the front face 14. The interior surface of the walls 13 define, at least partially and in conjunction with a recessed region 15 (see FIG. 1) of the front face 14, the second connection region. Once received in the recessed region 15, the muffler hanger 50 may be supported on an extension member 16 that extends outwardly from the recessed region 15. The connection between the tool support member 11 and the muffler hanger 50 may comprise, for example, an interference fit between the tool support member 11 and the muffler hanger 50.

As illustrated in FIG. 2, the recessed region 15 includes a plurality of mounting holes 18a, 18b that extend completely through the tool support member 11 from the front face 14 to the rear face 17. The mounting holes may include, for example, at least one upper mounting hole 18a and at least one lower mounting hole 18b which is arranged below the upper mounting hole 18a. During installation, the upper mounting hole(s) 18a and the lower mounting hole(s) 18b are configured to correspond to and align with the holes 23 (see FIG. 4) of the muffler hanger stay 40 and the holes 51, 52, 53 of the muffler hanger 50 (see FIG. 3).

As illustrated in FIG. 3, the recessed region 15 of the tool support member 11 may have a shape that substantially corresponds to the shape of the muffler hanger 50. Embodiments, however, are not limited thereto, and may reasonably encompass other geometric shapes that do not correspond to the shapes of the muffler hanger 50 yet permit practice of the concepts of the embodiments of the present disclosure. The connection between the tool support member 11 and the muffler hanger 50 is formed by receipt of the muffler hanger 50 into the recessed region 15 such that the muffler hanger 50 is supported on the extension member 16. This advantageously permits a quick and stable connection between the tool support member 11 and the muffler hanger 50. During installation, such a connection also advantageously results in an automatic alignment of the mounting holes 18a, 18b of the tool support member 11 with the holes 51, 52, 53 of the muffler hanger. Accordingly, corresponding support pins 21 (see FIG. 8B) of the muffler 20 and the support pin 31 of the vehicle frame 30 may be received in the mounting holes 18a, 18b of the tool support member 11 and the holes 51, 52, 53 of the muffler hanger 50.

As illustrated in FIG. 4, at an upper region of the tool support member 11, the walls 13 have a tapered external peripheral surface configured for engagement by an inner wall of the muffler hanger stay 40 at the first connection region to thereby connect the tool support member 11 and the muffler hanger stay 40. When connected, the muffler hanger stay 40 covers (at least partially, or entirely) the front face 14 of the tool support member 11. In accordance with some embodiments, the connection between the tool support member 11 and the muffler hanger stay 40 advantageously results in automatic alignment of the mounting holes 18a, 18b of the tool support member 11 and the holes of the muffler hanger stay 40. In that way, corresponding support pins 21 of the muffler 20 and corresponding support pins 31 of the vehicle frame 30 may be received in the mounting holes 18a, 18b of the tool support member 11 and the holes of the muffler hanger stay 40.

Figure 5:
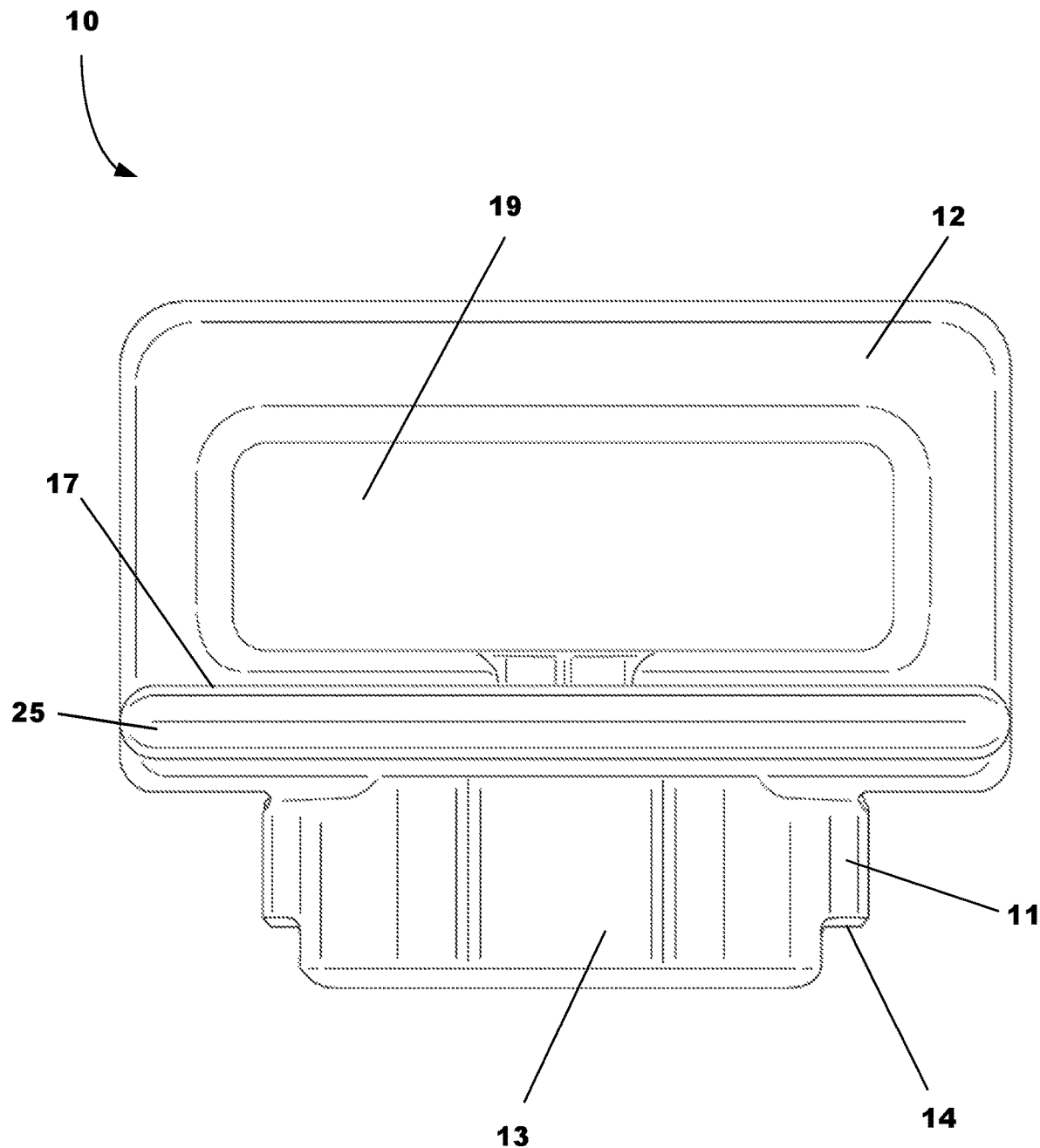
FIG. 5 illustrates a top view of the muffler hanger assembly tool of FIG. 2.
Figure 6:
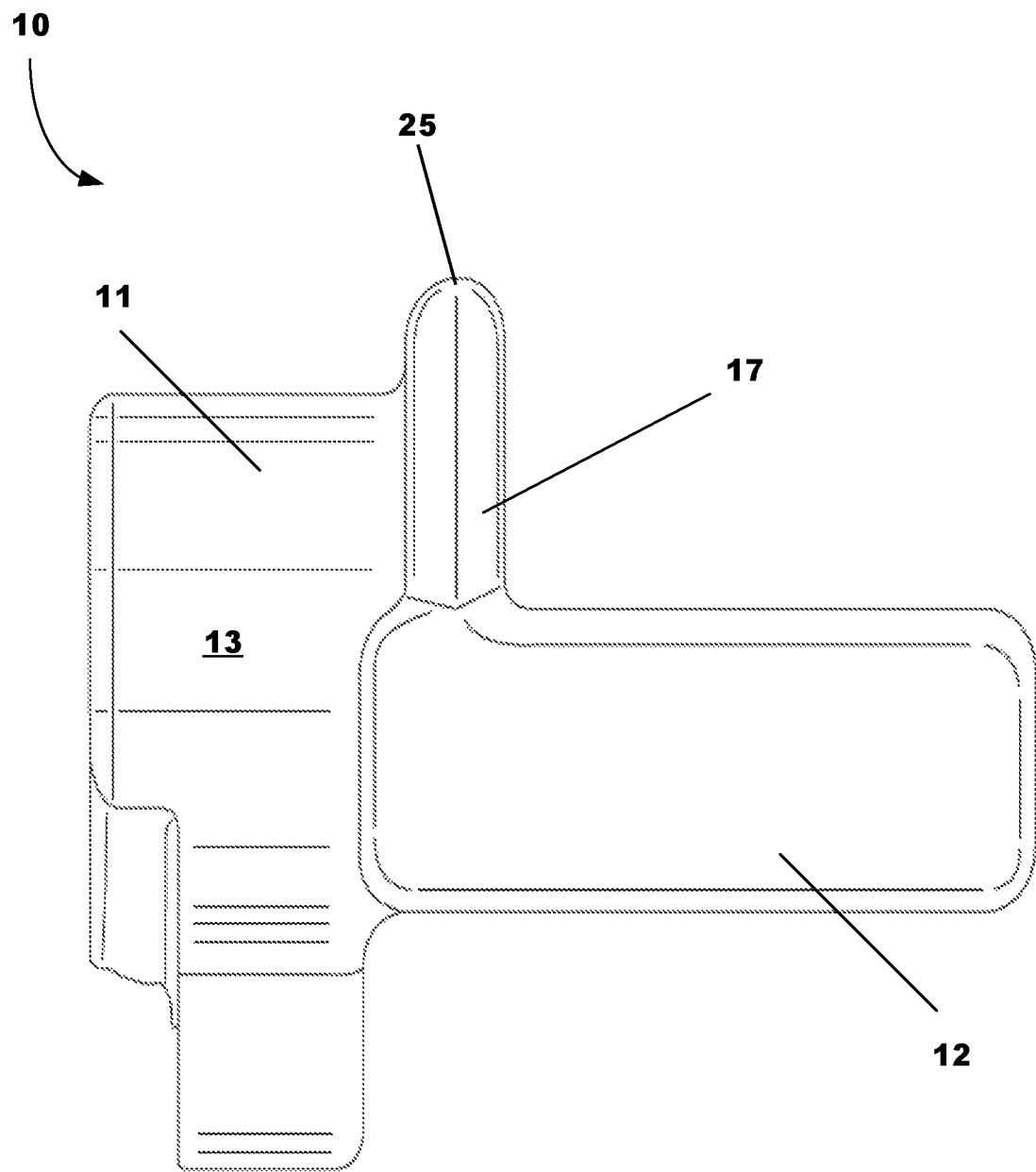
FIG. 6 illustrates a side view of the muffler hanger assembly tool of FIG. 2.
Figure 7:
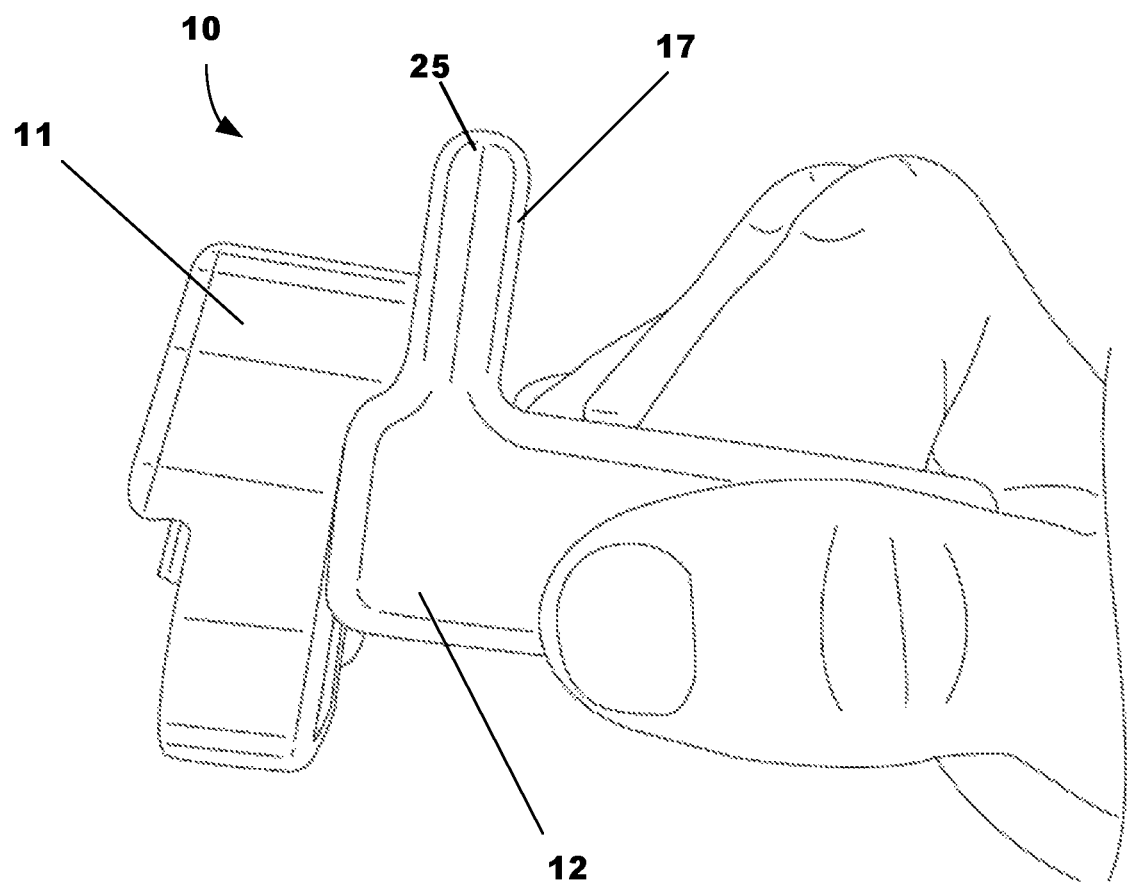
FIG. 7 illustrates a side perspective view of the muffler hanger assembly tool of FIG. 2 being gripped by a hand of a user.

As illustrated in FIGS. 5 to 7, the tool handle member 12 is configured to extend from the rear face 17 of the tool support member 11 that is arranged opposite to the front face 14. As an example, the tool support member 11, particularly the front face 14 and the rear face 17, extends in a first plane (or two parallel planes), whereas the tool handle member 12 extends from the rear face 17 in a second plane that is different (e.g., perpendicular) than the first plane. The tool handle member 12 includes a body having a rectangular shape that defines an opening 19 configured to be gripped, grasped, held, etc. by a user. Although the body of the tool handle member 12 is illustrated having a rectangular shape, embodiments are not limited thereto, and thus, may reasonably encompass other geometric shapes that permit practice of the embodiments of the present disclosure.

Accordingly, when the muffler hanger stay 40 is connected to the tool support member 11, the user may grip the tool handle member 12 and manipulate the tool 10 in a manner to align and mount the muffler hanger stay 40 on the muffler 20 and the vehicle frame 30. Likewise, when the muffler hanger 50 is connected to the tool support member 11, the user may grip the tool handle member 12 and manipulate the tool 10 in a manner to align and mount the muffler hanger 50 on the muffler 20 and the vehicle frame 30.

FIGS. 8A through 8H illustrate an installation sequence of a muffler 20 on the vehicle frame 30, in accordance with certain embodiments of the present disclosure.

Figure 8A:
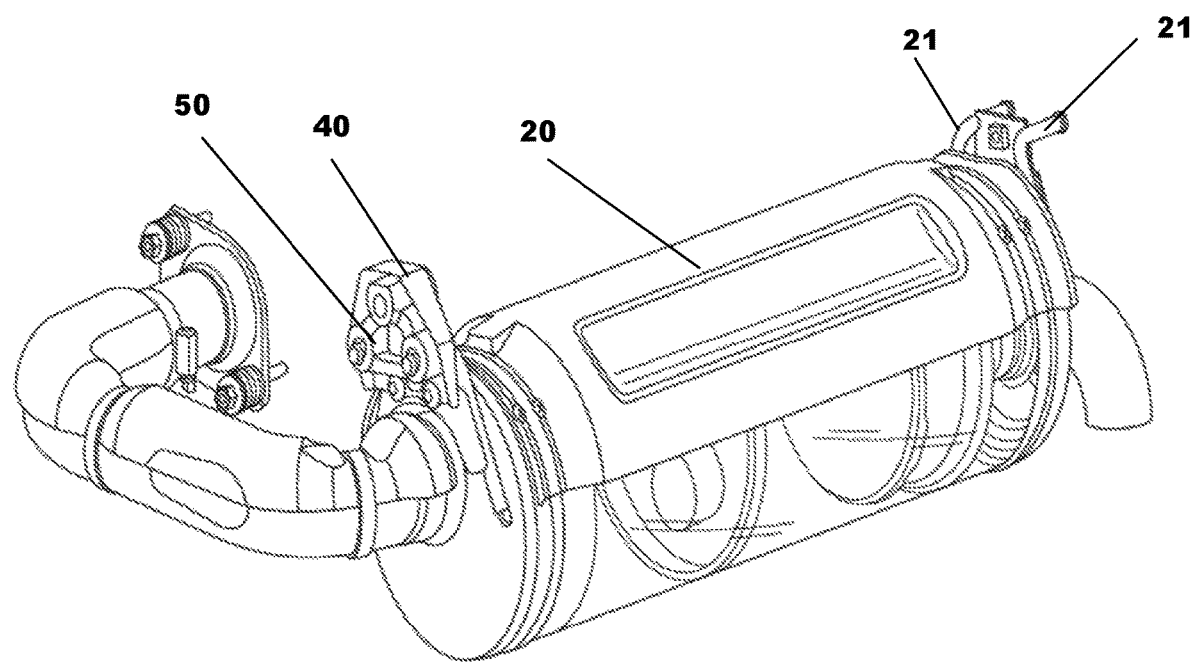
FIGS. 8A to 8H illustrate the assembly of a muffler on a vehicle using the muffler hanger assembly tool, in accordance with embodiments of the present disclosure.

As illustrated in FIG. 8A, one end (in the illustrated embodiment, a left-end) of the muffler 20 may come previously-equipped (either by retrofit or during manufacturing of the muffler assembly) with a muffler hanger assembly mounted thereon, e.g., a muffler hanger 50 and a mechanically connected (e.g., via one or more bolts 32) left muffler hanger stay 40. Alternatively, embodiments may permit a user to utilize the tool 10 to mount the muffler hanger 50 and the muffler hanger stay 40 on the muffler 20.

Figure 8B:
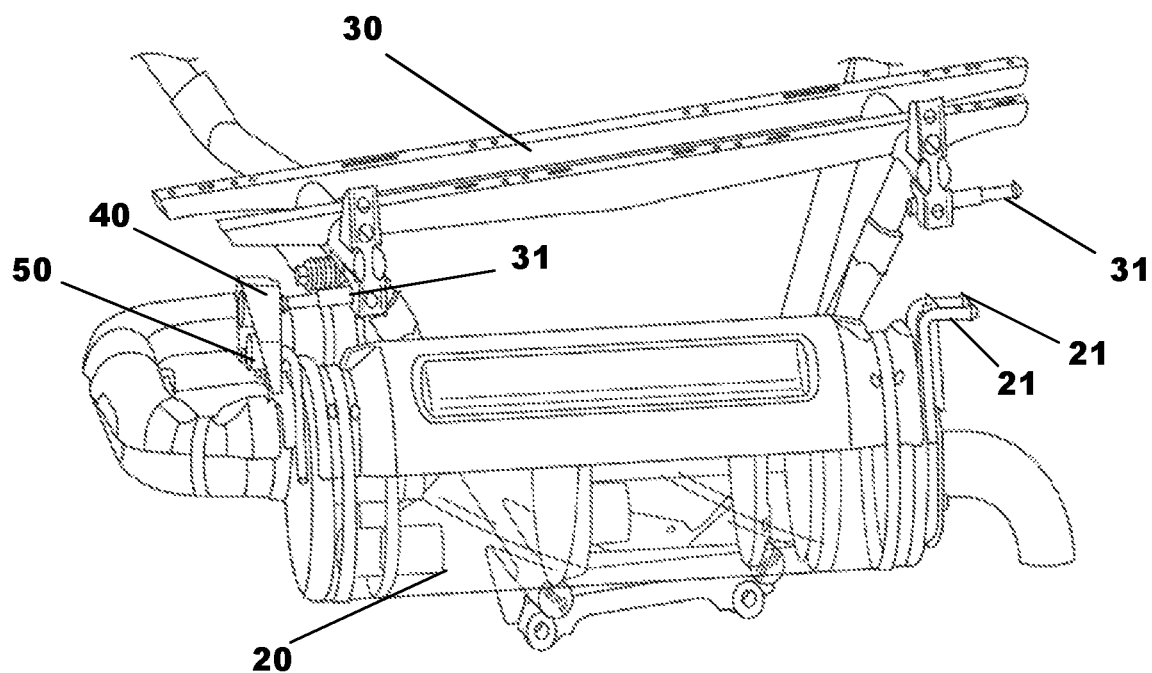
Figure 8C:
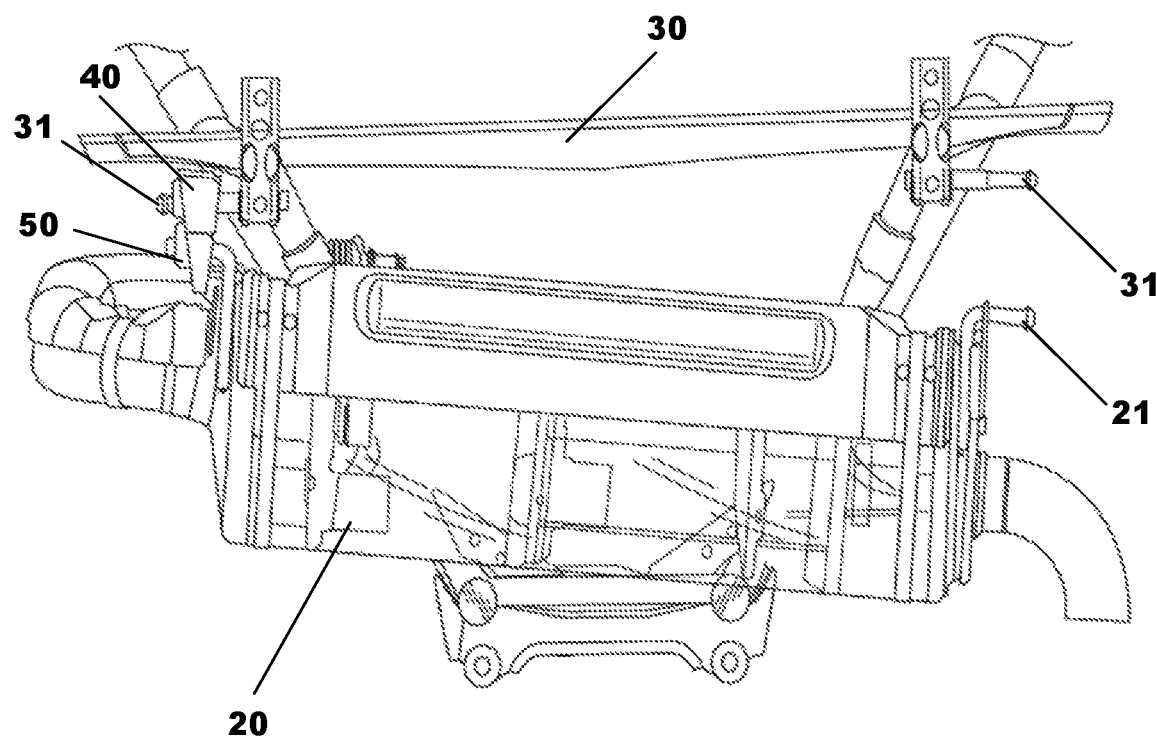

As illustrated in FIGS. 8B and 8C, the left-end of the muffler 20 previously-equipped with the muffler hanger assembly may be suspended or otherwise mounted on the left-side vehicle frame 30 by aligning (FIG. 8B) the left-side support pin 31 of vehicle frame 30 with the upper muffler hanger hole 51 (and corresponding hole of the muffler hanger stay 40), and then inserting (FIG. 8C) the left-side support pin 31 of vehicle frame 30 through the upper muffler hanger hole 51 (and corresponding hole of the muffler hanger stay 40).

FIGS. 8D through 8G respectively illustrate mounting of the muffler assembly to the right-side vehicle frame 30. First, the user connects the tool 10 and the right muffler hanger stay 40 in the manner illustrated in FIG. 4.

Figure 8D:
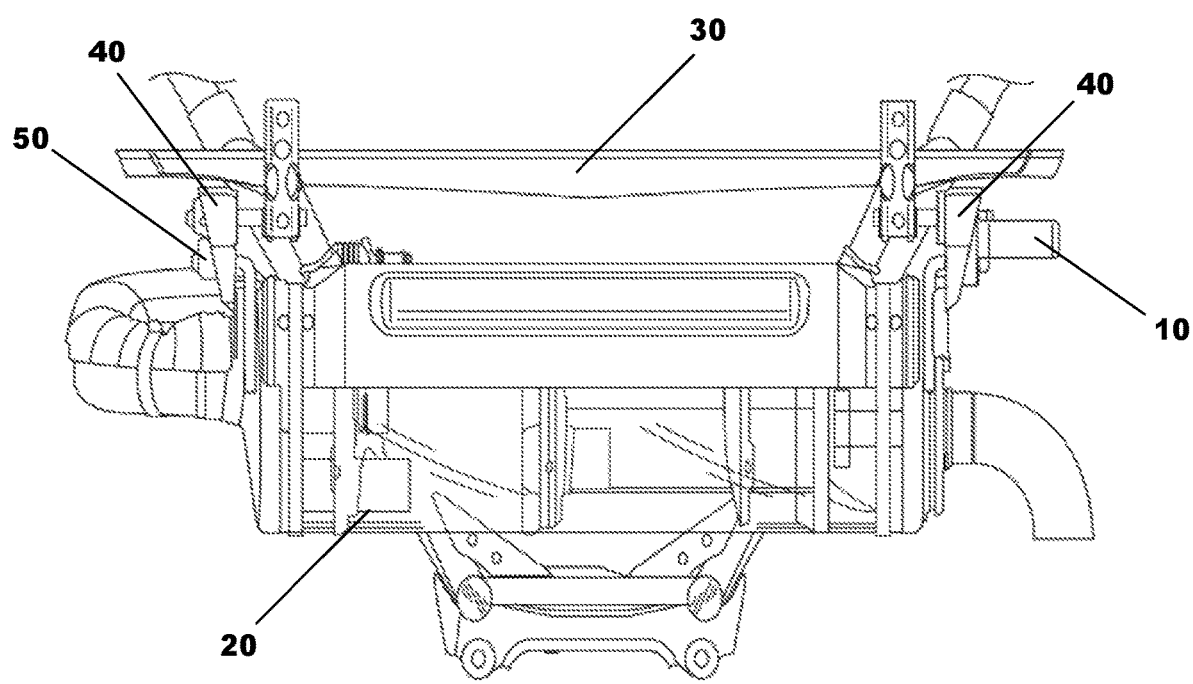
Figure 8E:
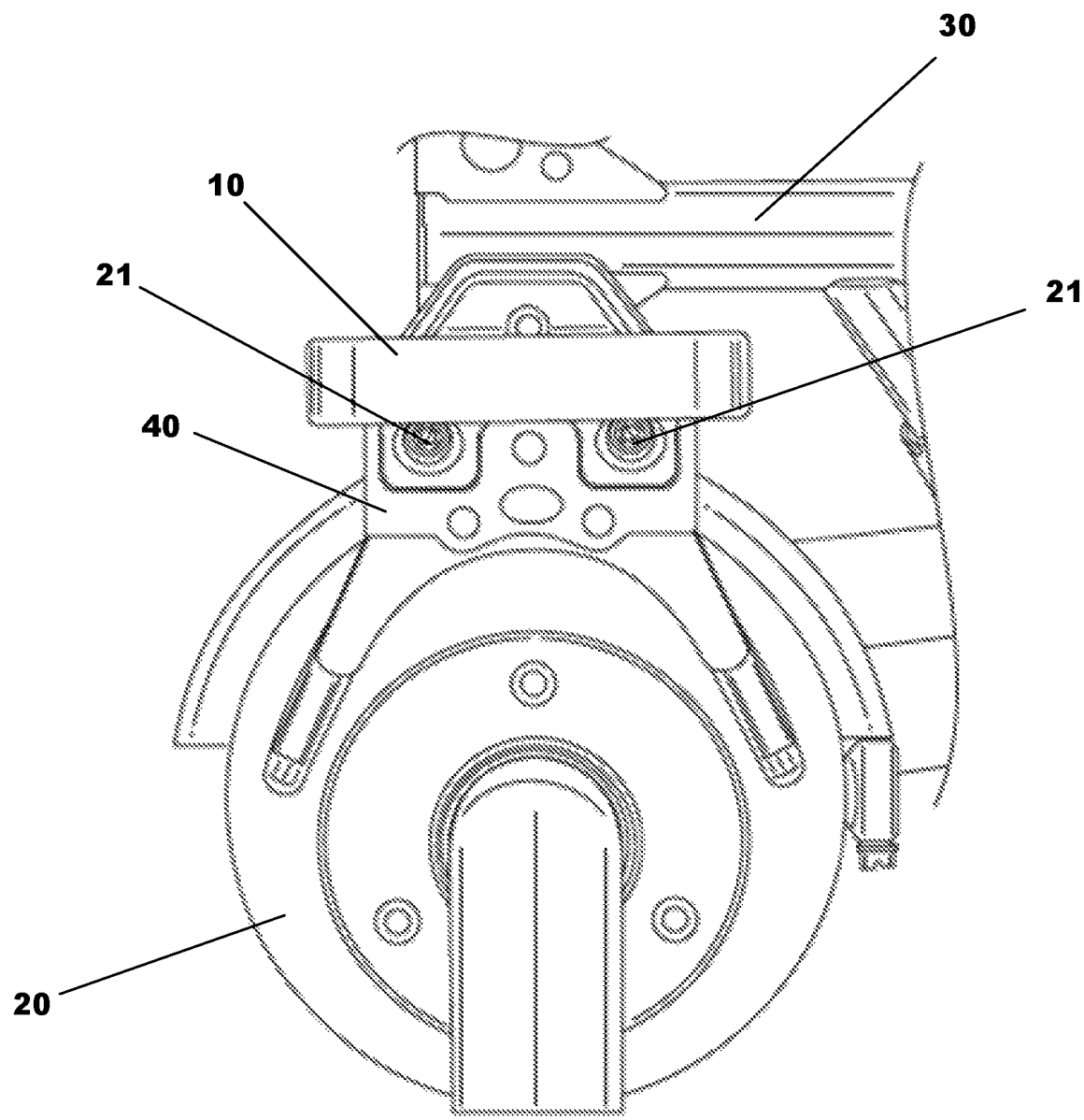

As illustrated in FIGS. 8D and 8E, the user may then mount the right-end of the muffler 20 using the connected tool 10 and right muffler hanger stay 40.

Figure 8F:
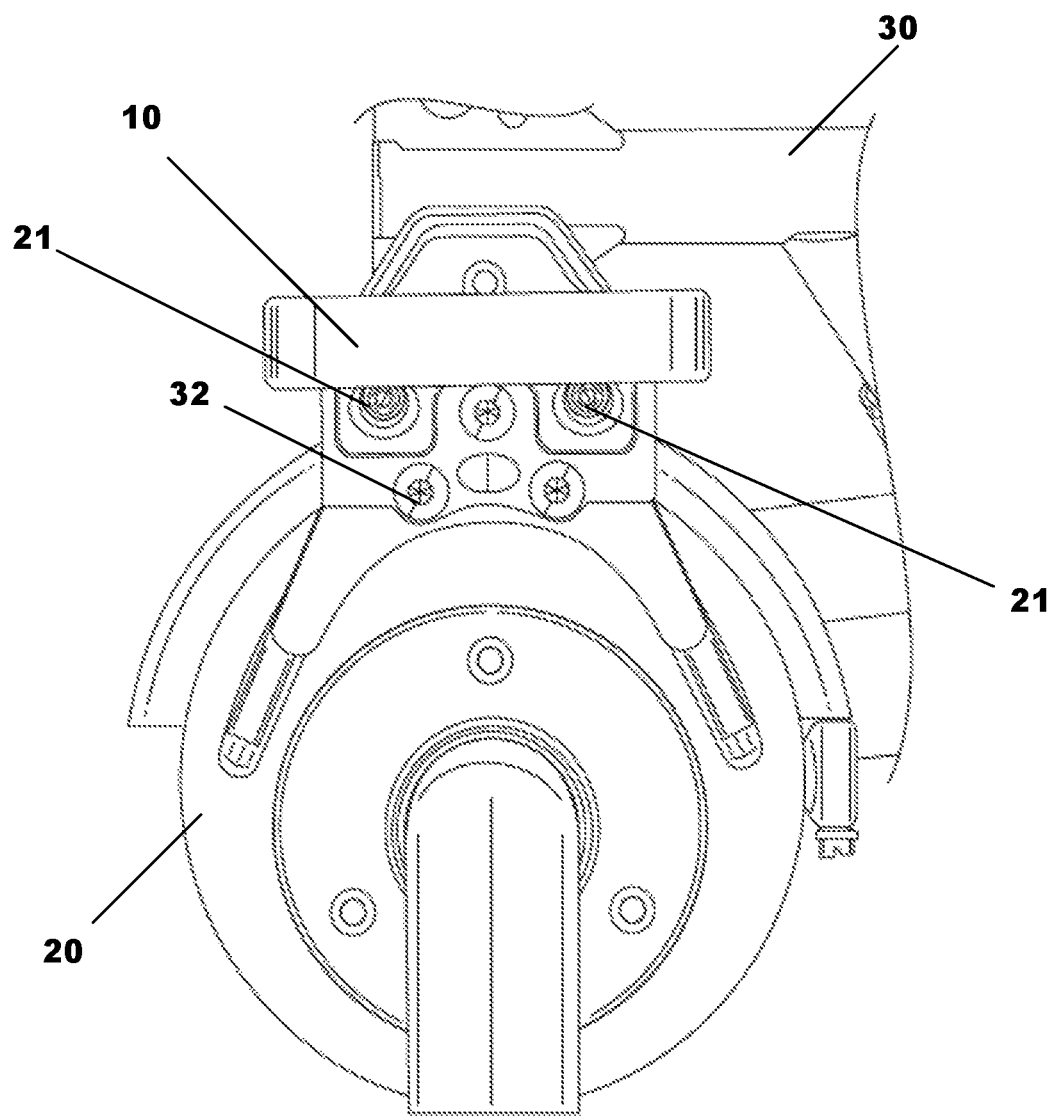

As illustrated in FIG. 8F, with the right muffler hanger stay 40 being properly aligned via the tool 10, the user may then mechanically connect (e.g., via one or more bolts 32) the right muffler hanger stay 40 to the muffler 20. The user may then disconnect the tool 10 from the right muffler hanger stay 40.

Figure 8G:
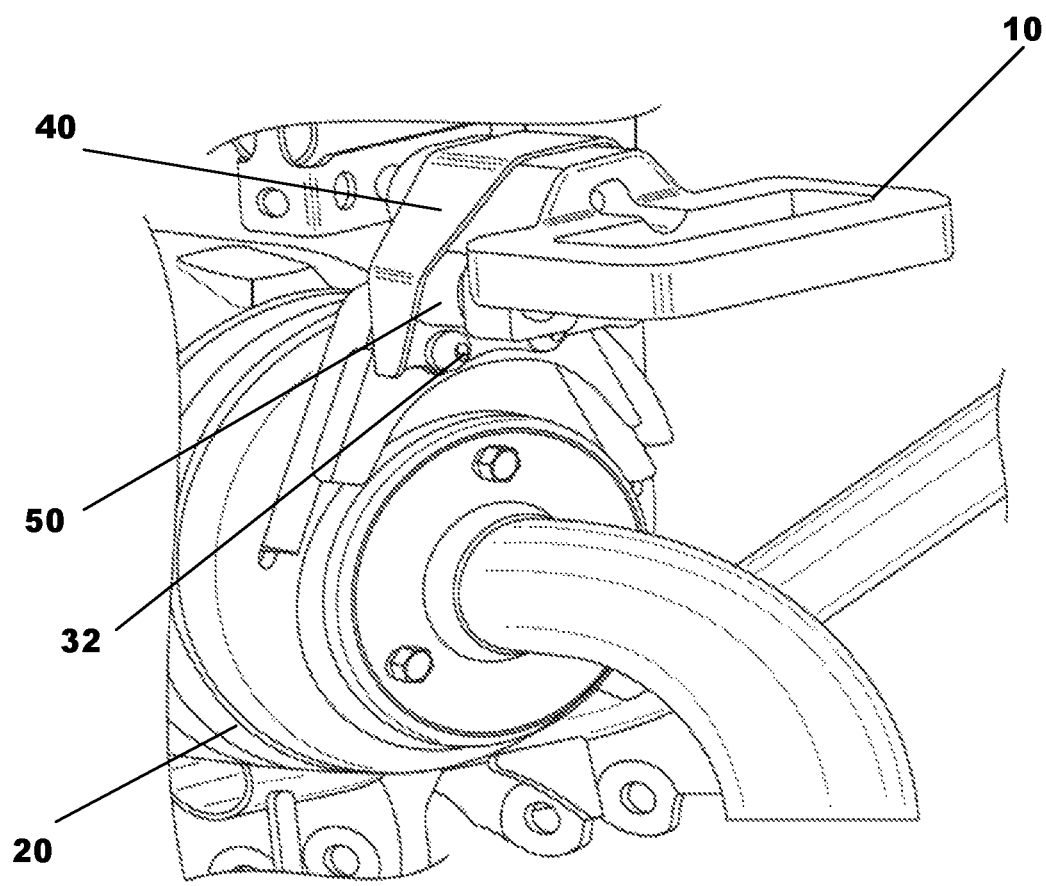
Figure 8H:
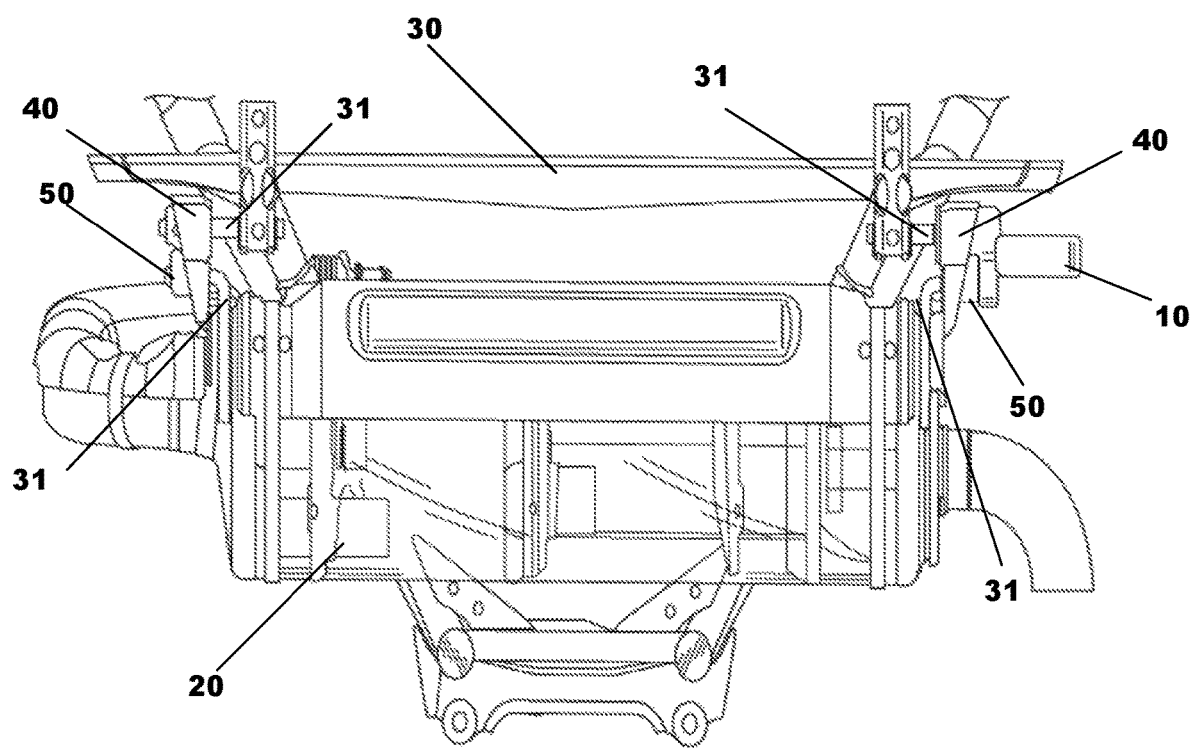

As illustrated in FIGS. 8G and 8H, the user may then connect the tool 10 to the right muffler hanger 50. The user may then align the right muffler hanger 50 via the tool 10 such that the corresponding right support pins 21 of the muffler 20 and the right support pin 31 of the vehicle frame 30 are received in the mounting holes 18a, 18b of the tool support member 11 and the holes 51, 52, 53 of the right muffler hanger 50. In accordance with some embodiments, the muffler hanger 50 may be fixed to the right-side of the muffler 20 and the right-side vehicle frame 30 by friction between the muffler hanger 50 and the right support pins 21 of the muffler 20 and the right support pins 31 of the vehicle frame 30.

The tool 10 may then be removed from the muffler hanger 50 leaving the muffler 20 installed on the vehicle frame 30 with the muffler hanger 50 and the muffler hanger stay 40. Accordingly, it will be understood that the tool 10 may be used to efficiently and ergonomically install the muffler 20. Moreover, the tool 10 may be used to install the muffler hanger 50 and the muffler hanger stay 40 using the same tool, thereby reducing the number of tools required.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

This written description uses examples to disclose the invention, including the preferred embodiments, and also to enable any person skilled in the art to practice the invention, including making and using any devices or systems and performing any incorporated methods. The patentable scope of embodiments is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, may be mixed and matched by one of ordinary skill in the art to construct additional embodiments and techniques in accordance with principles of this application.

What is claimed is:

1. A tool to mount a muffler on a vehicle, the tool comprising:
    a tool body including:
        a tool support member having a front face extending in a first plane, a rear face, mounting holes and walls with an external peripheral surface configured to connectively receive a muffler hanger stay to align the mounting holes with corresponding holes of the muffler hanger stay, the walls defining an interior recessed region configured to connectively receive a muffler hanger to align the mounting holes with corresponding holes of the muffler hanger, and
        a tool handle member extending from the rear face of the tool support member to define an opening configured to be gripped by a user to facilitate manual alignment and mounting of the muffler hanger and the muffler hanger stay on the muffler and the vehicle;
    wherein the walls extend outwardly from the front face in a direction opposite the tool handle member, and an extension member extends outwardly from the front face in a direction opposite the tool handle member for supporting the muffler hanger between the walls and the extension member when the muffler hanger is received in the interior recessed region.

2. The tool of claim 1, wherein the mounting holes comprise at least one upper mounting hole for alignment and mounting of the muffler hanger and the muffler hanger stay on the vehicle.

3. The tool of claim 2, wherein the mounting holes comprise at least one lower mounting hole for alignment and mounting of the muffler hanger and the muffler hanger stay on the muffler.

4. The tool of claim 1, wherein the tool handle member extends in a second plane that is different than the first plane.

5. The tool of claim 1, wherein the tool handle member extends in a second plane that is perpendicular to the first plane.

6. The tool of claim 1, wherein the tool support member and the tool handle member are composed of the same material.

7. The tool of claim 1, wherein the mounting holes extend through the face, and wherein the walls extend from the face around at least a portion of a perimeter of the face.

8. The tool of claim 1, wherein the tool support member comprises a first leg and a second leg that join together at a junction, and wherein the extension member is positioned between the first leg and the second leg at the junction.

9. A tool to mount a muffler on a vehicle, the tool comprising:
    a tool body including:
        a tool support member configured for connection to a muffler hanger stay at a first connection region provided at a peripheral surface of the tool support member, and also for connection to a muffler hanger at a second connection region provided at an interior recessed region of the tool support member, the tool support member having mounting holes configured for alignment with corresponding holes of the muffler hanger stay and the muffler hanger, and a tool handle member to permit gripping of the tool handle member and thereby permit manual alignment and mounting of the muffler hanger and the muffler hanger stay on the muffler and the vehicle, the tool handle member having a forward portion that extends laterally beyond lateral sides of the tool support member, the forward portion being joined to a rear face of the tool support member, the tool handle member having a rearward portion joined to the forward portion so as to define a loop having an opening to allow a user to extend a portion of a hand through the opening to grip the rearward portion of the tool handle member.

10. The tool of claim 9, wherein the mounting holes comprise an upper mounting hole for alignment and mounting of the muffler hanger and the muffler hanger stay on the vehicle.

11. The tool of claim 10, wherein the mounting holes comprise at least one lower mounting hole for alignment and mounting of the muffler hanger and the muffler hanger stay on the muffler.

12. The tool of claim 9, wherein the tool support member extends in a first plane and the tool handle member extends in a second plane that is different than the first plane.

13. The tool of claim 9, wherein the tool support member extends in a first plane and the tool handle member extends in a second plane that is perpendicular to the first plane.

14. The tool of claim 9, wherein the tool support member comprises a substantial A shape.

15. The tool of claim 9, wherein the tool support member comprises front face and a wall extending away from the front face in a direction opposite of the tool handle member, the wall at least partially defining the first connection region and the second connection region.

16. The tool of claim 15, wherein the tool support member comprises a first leg and a second leg that join together at a junction, and wherein the interior recessed region includes an extension member that extends outwardly therefrom between the first leg and the second leg at the junction in the direction opposite of the tool handle, and wherein the extension member is configured to support the muffler hanger when received in the interior recessed region in a space defined between the extension member and the wall.

17. A tool to mount a muffler on a vehicle, the tool comprising:

a tool body including a tool support member configured for connection to a muffler hanger stay at a first connection region provided at a peripheral surface of the tool support member, and also for connection to a muffler hanger at a second connection region provided at an interior recessed region of the tool support member, the tool support member having mounting holes configured for alignment with corresponding holes of the muffler hanger stay and the muffler hanger, wherein the tool body is configured to permit manual alignment and mounting of the muffler hanger and the muffler hanger stay on the muffler and the vehicle;

wherein the tool support member comprises a front face and a wall extending away from the front face, the wall defining at least a portion of the first connection region and the second connection region, the tool support member further comprising a first leg and a second leg that join together at a junction, and wherein an extension member is positioned between the first leg and the second leg at the junction, the extension member extending away from the front face for supporting the muffler hanger at the second connection region.

18. The tool of claim 17, wherein the mounting holes comprise:

at least one upper mounting hole for alignment and mounting of the muffler hanger and the muffler hanger stay on the vehicle; and at least one lower mounting hole for alignment and mounting of the muffler hanger and the muffler hanger stay on the muffler.

19. The tool of claim 17, further comprising a tool handle member to permit gripping of the tool handle member and thereby permit manual alignment and mounting of the muffler hanger and the muffler hanger stay on the muffler and the vehicle, the tool handle member having a forward portion that extends laterally beyond lateral sides of the tool support member, the forward portion being joined to a rear face of the tool support member, the tool handle member having a rearward portion joined to the forward portion so as to define a loop having an opening to allow a user to extend a portion of a hand through the opening to grip the rearward portion of the tool handle member.

20. The tool of claim 17, wherein the front face extends in a first plane, and wherein the tool support member has a rear face that extends in a second plane that is substantially parallel to the first plane.

* * * * *